United States Patent Office 3,326,865
Patented June 20, 1967

3,326,865
SULFOXIDE RESINS
Harry A. Smith, Midland, Mich., assignor to The Dow
Chemical Company, Midland, Mich., a corporation of
Delaware
No Drawing. Filed Mar. 27, 1963, Ser. No. 268,444
4 Claims. (Cl. 260—79.3)

The present invention relates to a new and useful class of linear polyarylene sulfoxides and to a novel method for their preparation. More particularly the present invention concerns novel sulfoxide resins and the novel process for preparing the new class of sulfoxides. Further, the present invention concerns laminates and films and fibers produced employing the sulfoxide resins here disclosed.

It has now been found that a linear polyphenylene sulfide having the general formula

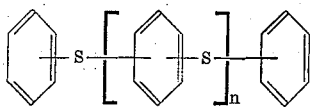

wherein $n$ represents an integer greater than 1, can be oxidized to its corresponding sulfoxide with nitric acid under anhydrous conditions without oxidation of the sulfur moieties to sulfone. Substantially any phenylene sulfide can be oxidized in the foregoing manner, but preferably the present invention relates to the oxidation to sulfoxide of the linear polyphenylene sulfides prepared in the manner of Macallum, U.S. Patent Nos. 2,513,188 and 2,538,941 or copending U.S. patent application Ser. No. 85,209, entitled "Method for Preparing Linear Polyarylene Sulfides," filed Jan. 27, 1961, by Lenz et al., now abandoned.

The polyphenylene sulfoxides of the present invention are prepared by reacting a linear polyarylene sulfide with 60–80% nitric acid under the following conditions:

Temperature _____ −20° C. to about 40° C.
    Preferred _____ −10° C. to +5° C.
Time _____ 3 to 30 hours.
    Preferred _____ 10 to 30 hours.
Pressure _____ Subatmospheric, atmospheric, superatmospheric.
    Preferred _____ Atmospheric.
Reactant ratios ___ 0.5–1.5 moles HNO₃ to 1 mole —φ—S— unit.
    Preferred _____ 0.54 HNO₃ to 1.0 —φ—S— unit.

The materials prepared by the manner of the present invention are adhesives useful in laminating metals, wood, paper, glass and like materials. The sulfoxides are also fiber-forming materials as well as film forming. The linear sulfoxides of the present invention can be heated under an inert atmosphere, e.g. argon, to above about 350° C. to about 700° C. for ½ to 100 hours to prepare oxidation stable materials which are thermally stable above about 600° C. These latter materials are useful as high-temperature adhesives, molding compositions, films, and the like. Further, the sulfoxide polymers can be chemically crosslinked by halogenating with bromine or chlorine, the linear polymer and then reacting the halogenated polymer with Na₂S to effect the crosslink. These chemically treated materials are useful as adhesives and can be formed into films. The techniques for these two treatments are clearly taught in copending applications Ser. No. 268,445, filed even date herewith, entitled, "Novel Thermal Stable Resins and Products Produced Therewith," and, Ser. No. 268,471, filed even date herewith, entitled, "Chemically Crosslinked Polyphenylene Sulfides."

The following examples illustrate the present invention but are not to be construed as limiting.

*Example 1*

To a slurry of 5.0 grams of linear phenylene sulfide (prepared in accordance with the techniques described in copending application Ser. No. 85,209 and having a melt viscosity at 303° C. of 2000 poises, a melting point of 282°–287° C. and a molecular weight of about 7000) in 200 ml. of acetic anhydride cooled to −10° C. was added 1.72 ml. (0.0250 mole) of 70% aqueous nitric acid in 50 ml. of acetic anhydride with stirring. The resulting mixture was continuously stirred for 24 hours while maintaining the temperature at between 0–5° C., after which it was poured into ice-water, neutralized with sodium carbonate and filtered to recover the polymer. The polymer was slurried in methylene chloride, the slurry filtered, and the filter cake, the polymer, dried. As a result of these operations there was obtained 5.10 grams of polymer representing a yield of 89% based on the starting material. The polymer had a melting point of 280°–290° C., a melt viscosity at 303° C. of 2400 poises and a molecular weight of 8000 (determined by melt viscosity). Infrared analysis showed no sulfone moieties and no sulfide moieties, only sulfoxide moieties.

To demonstrate the adhesive quality of the resins of Example 1 of the present invention, a laminate bond was prepared by bonding two 1" x 4" 17–7 pH stainless steel bars 0.062" thick (cleaned with methyl ethyl ketone, scrubbed with scouring powder and water, rinsed, then immersed in aqua regia, rinsed in distilled water and dried) so as to give a ½" lap joint, having the resin of Example 1 therebetween. The bars and polymer were pressed for 3 hours at 315° C. and under about 1000 lbs. ram pressure. A lap shear strength of 560 p.s.i. was obtained using an Instron test machine according to ASTM Test. No. 1002–SST.

It is to be understood that while all references hereinbefore have been made to the complete oxidation to the sulfoxide that polymeric materials can be prepared by only partially oxidizing the sulfur moieties to the sulfoxide, thus to obtain a mixed sulfoxide-sulfide polymeric material which has utility of like character to the sulfoxide and sulfides disclosed in this and my copending applications.

I claim:

1. A method for preparing polyphenylene sulfoxides having the following formula

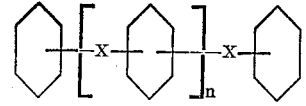

wherein X represents an independently selected member from the group consisting of the radicals —S— and

at least one of such members being

and, $n$ represents an integer greater than 1, which comprises reacting a linear polyphenylene sulfide with about a molar equivalent based on theoretical sulfide moieties of 60–80% nitric acid at a temperature from about −20° to about 40° C. for from 3 to about 30 hours.

2. A compound having the generic formula

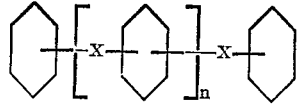

werein X represents an independently selected member from the group consisting of the radicals —S— and

at least one of such members being

and, n represents an integer greater than 1.

3. A compound of claim 2 wherein $n$ in an integer such as to yield a polymer having a molecular weight of about 8000 and which polymer all of the X's are

radicals.

4. A compound having the generic formula

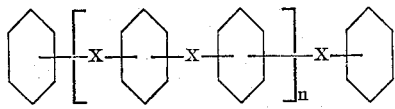

wherein each X represents an independently selected member from the group consisting of the radicals —S— and

at least one of such members being $$-\overset{O}{\underset{\|}{\underset{S}{-}}}-$$

and $n$ represents an integrer greater than 1.

References Cited

UNITED STATES PATENTS

| | | | |
|---|---|---|---|
| 2,500,149 | 3/1950 | Boyer | 260—79.3 |
| 2,513,188 | 6/1950 | Macallum | 260—79.1 |
| 2,538,941 | 1/1951 | Macallum | 260—79.1 |
| 2,808,396 | 10/1957 | Hill | 260—79.3 |
| 3,002,868 | 10/1961 | Boivin | 161—93 |
| 3,091,019 | 5/1963 | Wetterau | 161—93 |

OTHER REFERENCES

Reid, E. E., Organic Chemistry of Bivalent Sulfur, vol. II, Chem. Pub. Co. 1960, p. 64.

JOSEPH L. SCHOFER, *Primary Examiner.*

D. K. DENENBERG, J. F. McNALLY,
*Assistant Examiners.*